(12) United States Patent
Kishi et al.

(10) Patent No.: US 12,533,760 B2
(45) Date of Patent: Jan. 27, 2026

(54) GUIDE APPARATUS AND GUIDE STRUCTURE

(71) Applicant: THK CO., LTD., Tokyo (JP)

(72) Inventors: Hiroyuki Kishi, Tokyo (JP); Ryuji Furusawa, Tokyo (JP); Tomomitsu Hirohashi, Tokyo (JP); Ayako Miyajima, Tokyo (JP); Hiroyoshi Yasutake, Tokyo (JP); Ryunosuke Ozeki, Tokyo (JP); Ryosuke Maruki, Tokyo (JP)

(73) Assignee: THK CO., LTD., Tokyo (JP)

( * ) Notice: Subject to any disclaimer, the term of this patent is extended or adjusted under 35 U.S.C. 154(b) by 570 days.

(21) Appl. No.: 17/925,641

(22) PCT Filed: May 24, 2021

(86) PCT No.: PCT/JP2021/019648
§ 371 (c)(1),
(2) Date: Nov. 16, 2022

(87) PCT Pub. No.: WO2021/241510
PCT Pub. Date: Dec. 2, 2021

(65) Prior Publication Data
US 2023/0182247 A1 Jun. 15, 2023

(30) Foreign Application Priority Data
May 26, 2020 (JP) .................................. 2020-091472
May 26, 2020 (JP) .................................. 2020-091565

(51) Int. Cl.
*B23Q 3/00* (2006.01)
*B23Q 11/00* (2006.01)
*F16C 32/06* (2006.01)

(52) U.S. Cl.
CPC .......... *B23Q 3/005* (2013.01); *B23Q 11/0032* (2013.01); *F16C 32/0633* (2013.01); *F16C 32/064* (2013.01)

(58) Field of Classification Search
CPC . B23Q 3/005; B23Q 11/0032; F16C 32/0633; F16C 32/064
See application file for complete search history.

(56) References Cited

U.S. PATENT DOCUMENTS 2,980,473 A * 4/1961 Tanis .................. F16C 32/0633
384/368
4,659,238 A * 4/1987 Teramachi .............. F16C 33/36
384/44

(Continued)

FOREIGN PATENT DOCUMENTS

JP    S57-155314 U    9/1982
JP    H02-009324 U    1/1990

(Continued)

OTHER PUBLICATIONS

International Search Report dated Aug. 10, 2021, issued in counterpart International Application No. PCT/JP2021/019648.

(Continued)

*Primary Examiner* — Omar Flores Sanchez
(74) *Attorney, Agent, or Firm* — WHDA, LLP

(57) ABSTRACT

A guide apparatus includes a track member, a movable member having a first rolling surface that forms a load rolling passage together with a rolling surface of the track member, and a damper provided on a first surface. The first surface is at least a portion of the surface of the movable member opposed to the track member excluding the first rolling surface. The damper includes a plate member disposed in such a way as to cover the first area and a reservoir space formed between one surface of the plate member and the first area. The reservoir space contains a damping (Continued)

medium and allows the plate member to displace relative to the first area. The damper is provided on the movable member in such a way that the other surface of the plate member slides on at least a portion of the surface of the track member opposed to the movable member.

20 Claims, 8 Drawing Sheets

(56) References Cited

U.S. PATENT DOCUMENTS

| | | | | |
|---|---|---|---|---|
| 4,953,988 | A * | 9/1990 | Tsukada | F16C 29/0642 |
| | | | | 384/8 |
| 4,968,155 | A | 11/1990 | Bode | |
| 5,044,780 | A * | 9/1991 | Teramachi | F16C 29/10 |
| | | | | 384/44 |
| 5,980,110 | A * | 11/1999 | Lyon | F16C 29/025 |
| | | | | 384/12 |
| 6,012,845 | A * | 1/2000 | Lyon | F16C 32/064 |
| | | | | 384/12 |
| 6,086,254 | A * | 7/2000 | Lyon | F16C 32/064 |
| | | | | 384/44 |
| 6,550,969 | B1 * | 4/2003 | Mischler | F16C 33/6651 |
| | | | | 384/44 |
| 8,414,190 | B2 * | 4/2013 | Kishi | F16C 29/005 |
| | | | | 384/49 |
| 2010/0290724 | A1 * | 11/2010 | Huang | F16C 32/064 |
| | | | | 384/12 |

FOREIGN PATENT DOCUMENTS

| | | |
|---|---|---|
| JP | H03-031933 B2 | 5/1991 |
| JP | H06-020899 Y2 | 6/1994 |
| JP | H06-102288 B2 | 12/1994 |
| JP | H07-217651 A | 8/1995 |
| JP | 2010-266065 A | 11/2010 |
| WO | 2019/150923 A1 | 8/2019 |

OTHER PUBLICATIONS

PCT/ISA/237, Written Opinion of the International Searching Authority dated Aug. 10, 2021, issued in counterpart International Application No. PCT/JP2021/019648.

Office Action dated Apr. 10, 2025, issued in counterpart CN Application No. 202180037529.9, with English translation. (14 pages).

* cited by examiner

[Fig. 1]
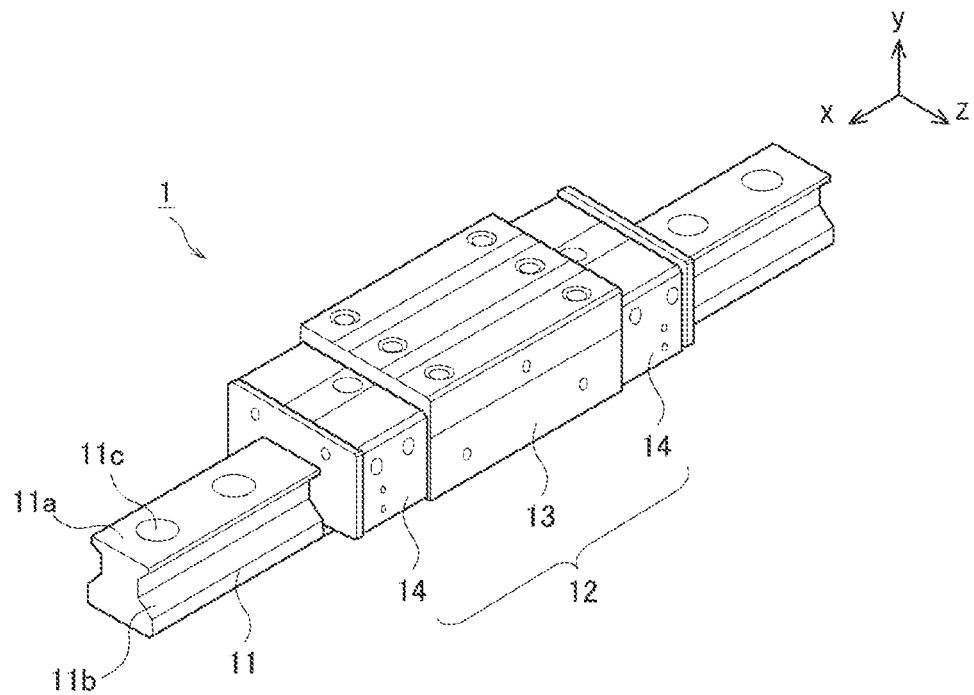
[Fig. 2]
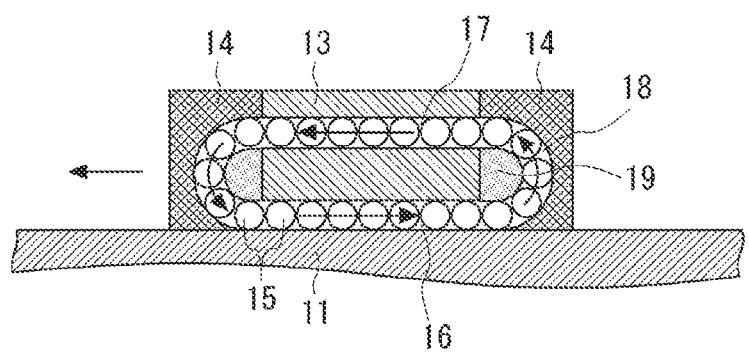

[Fig. 3]
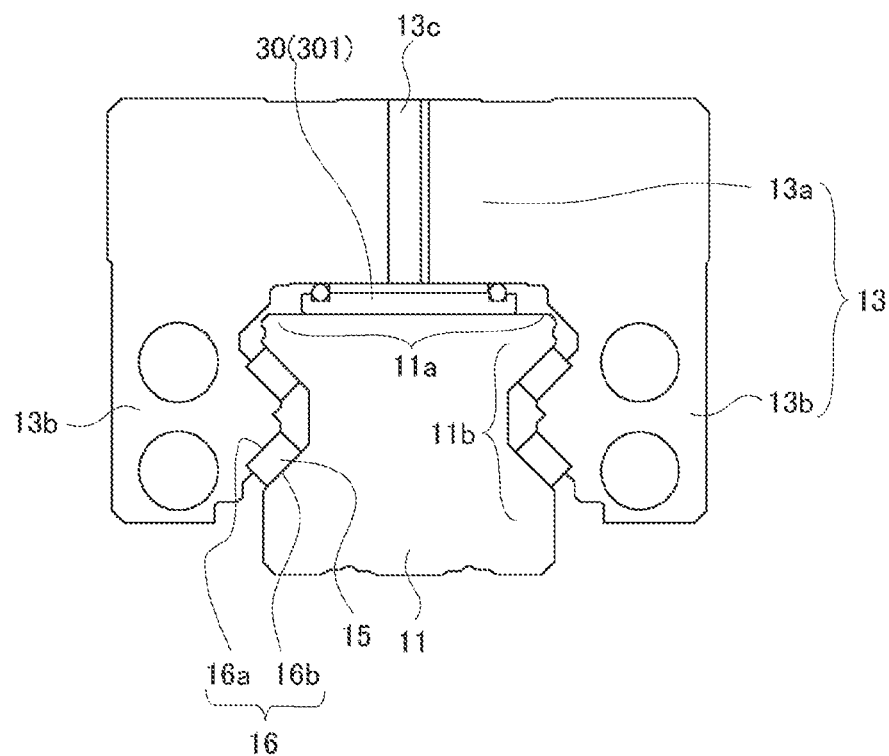
[Fig. 4]
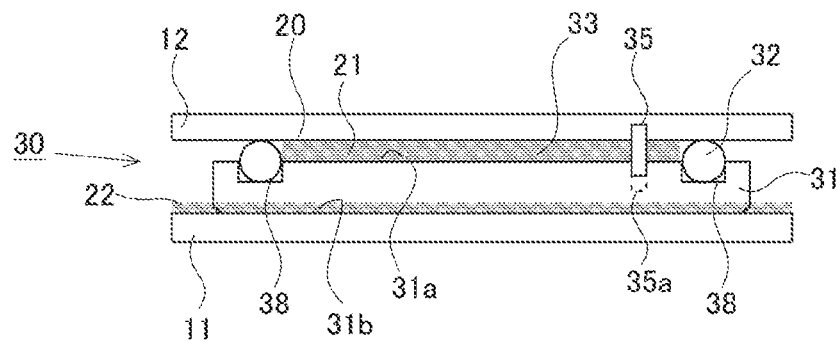

[Fig. 5]
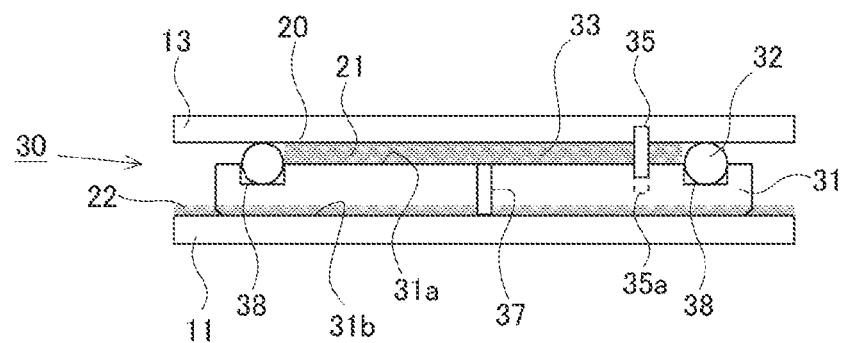
[Fig. 6]
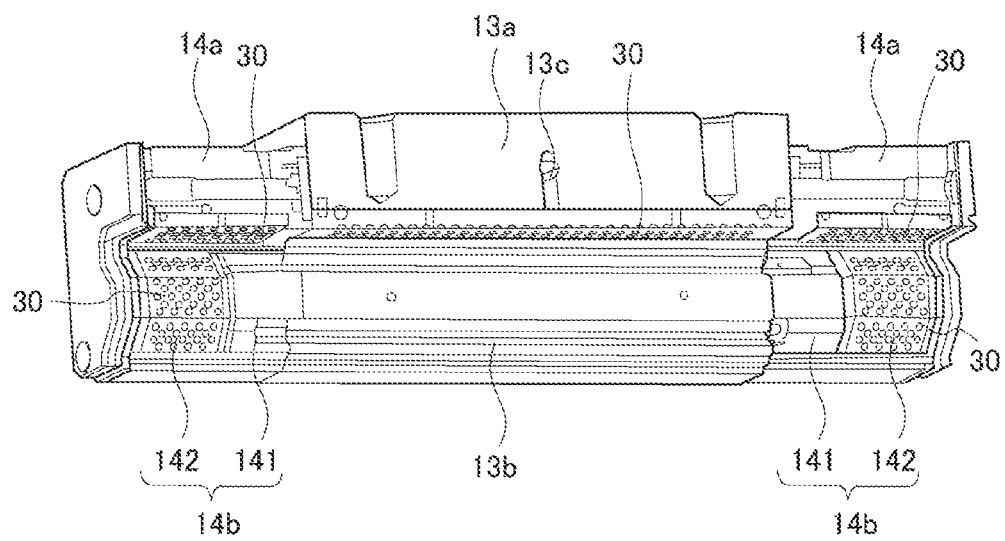

[Fig. 7]
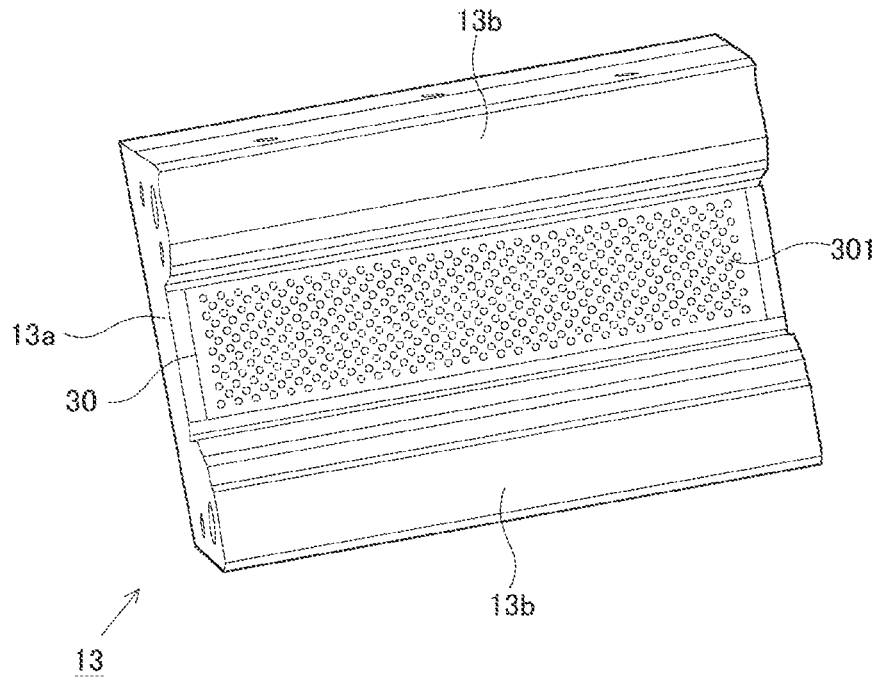
[Fig. 8]
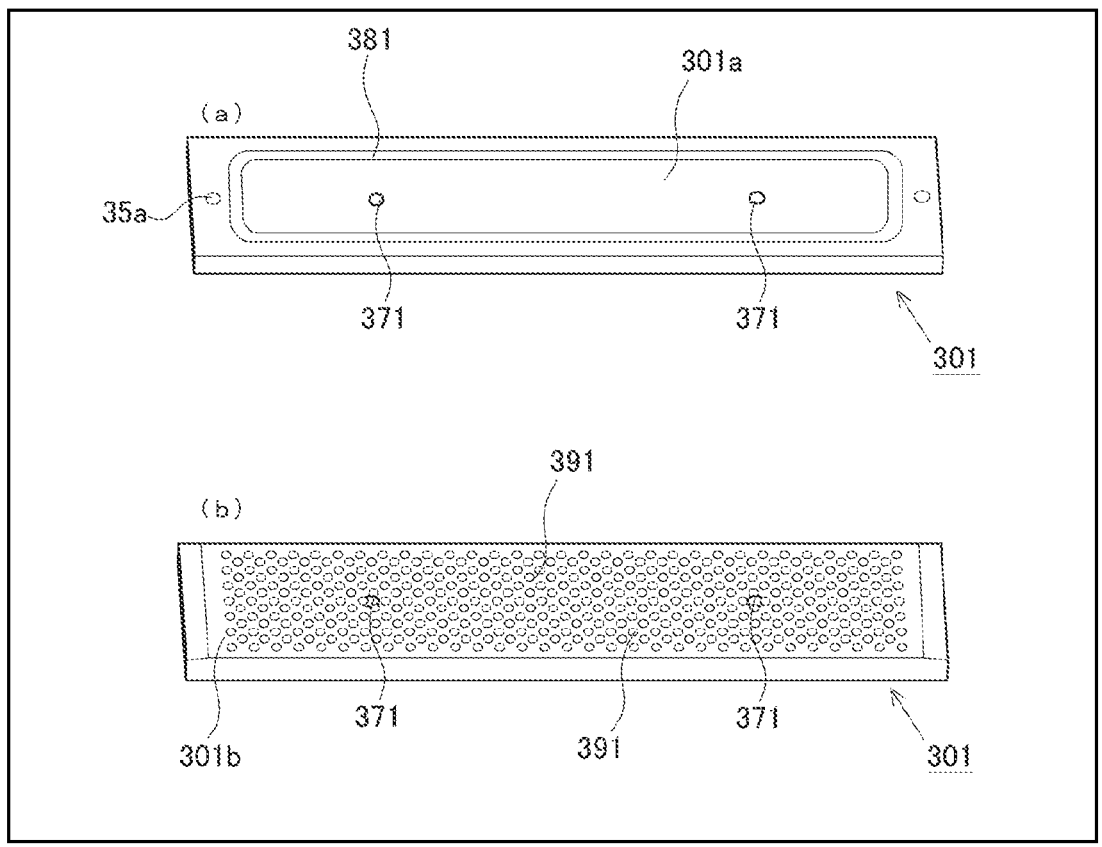

[Fig. 9]
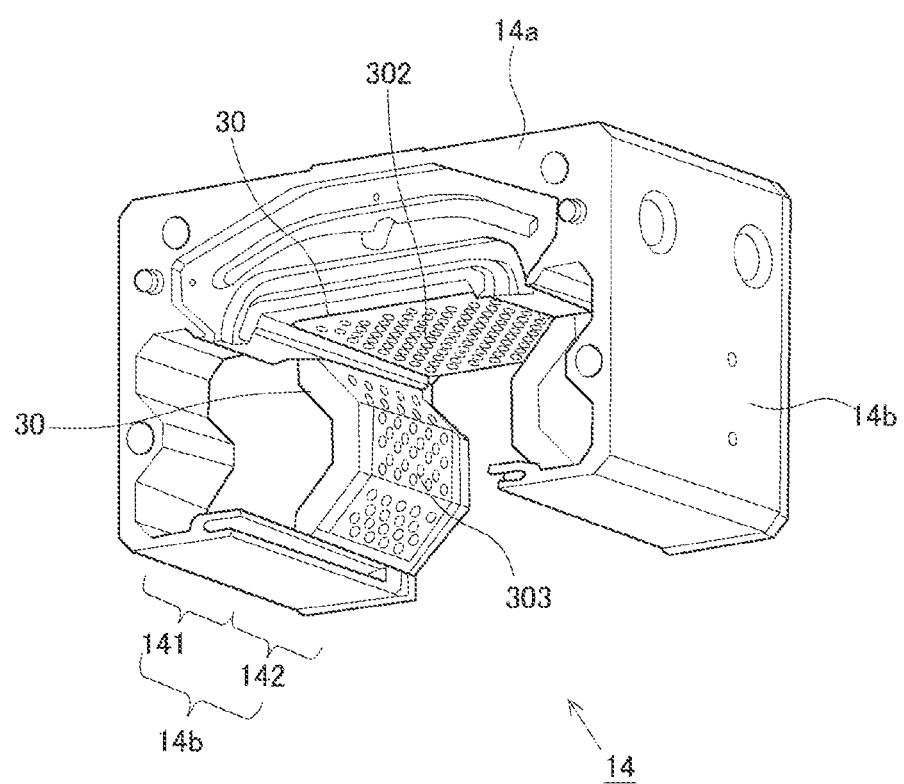

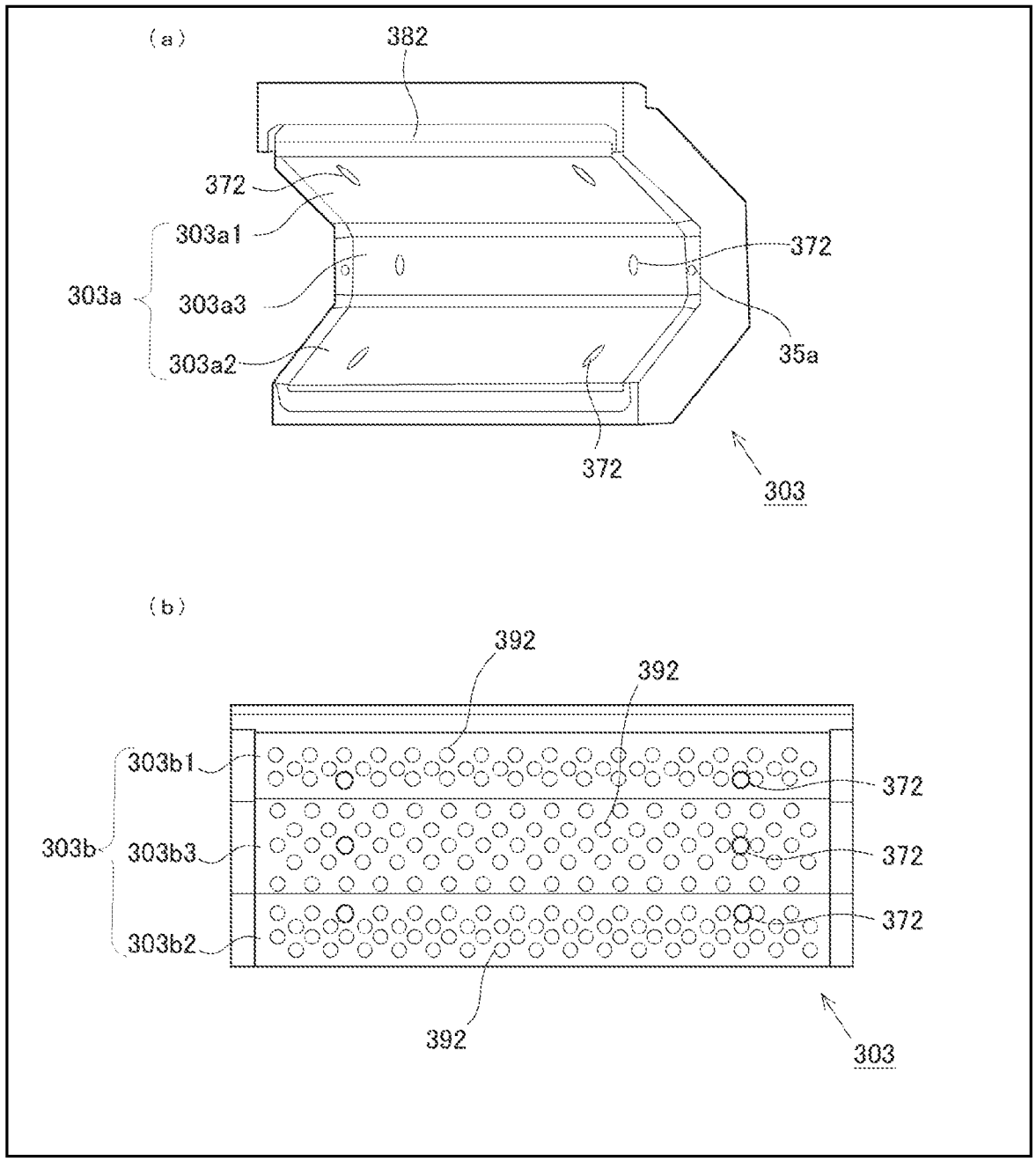
[Fig. 10]

[Fig. 11]
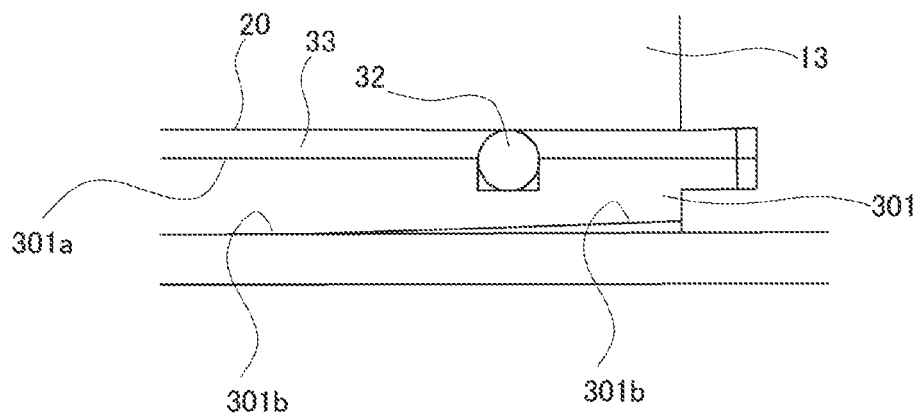
[Fig. 12]
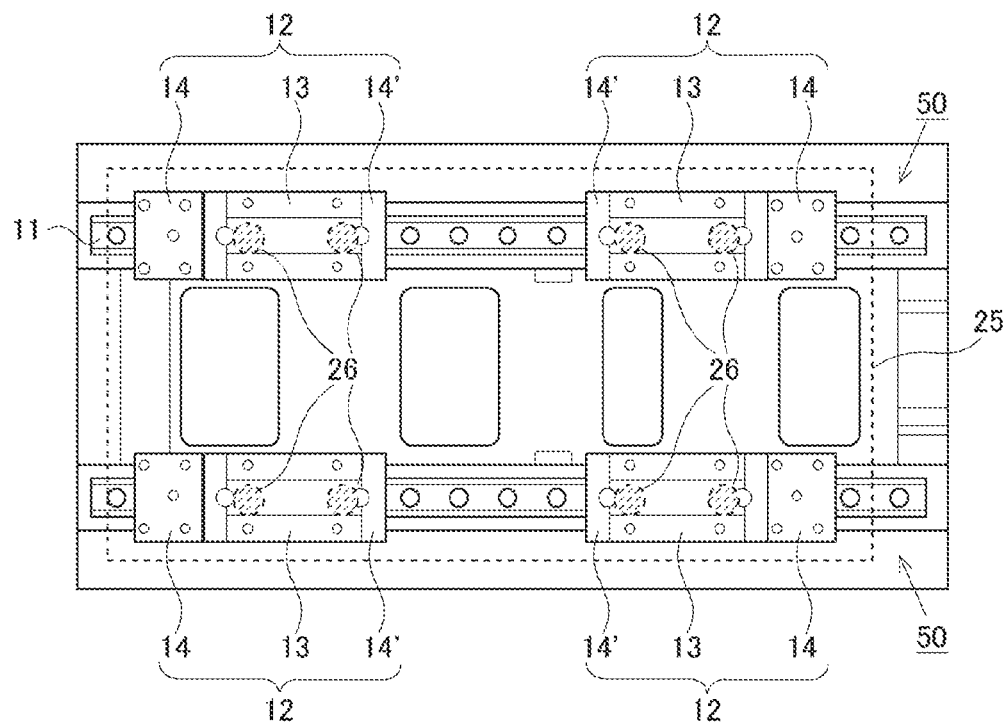

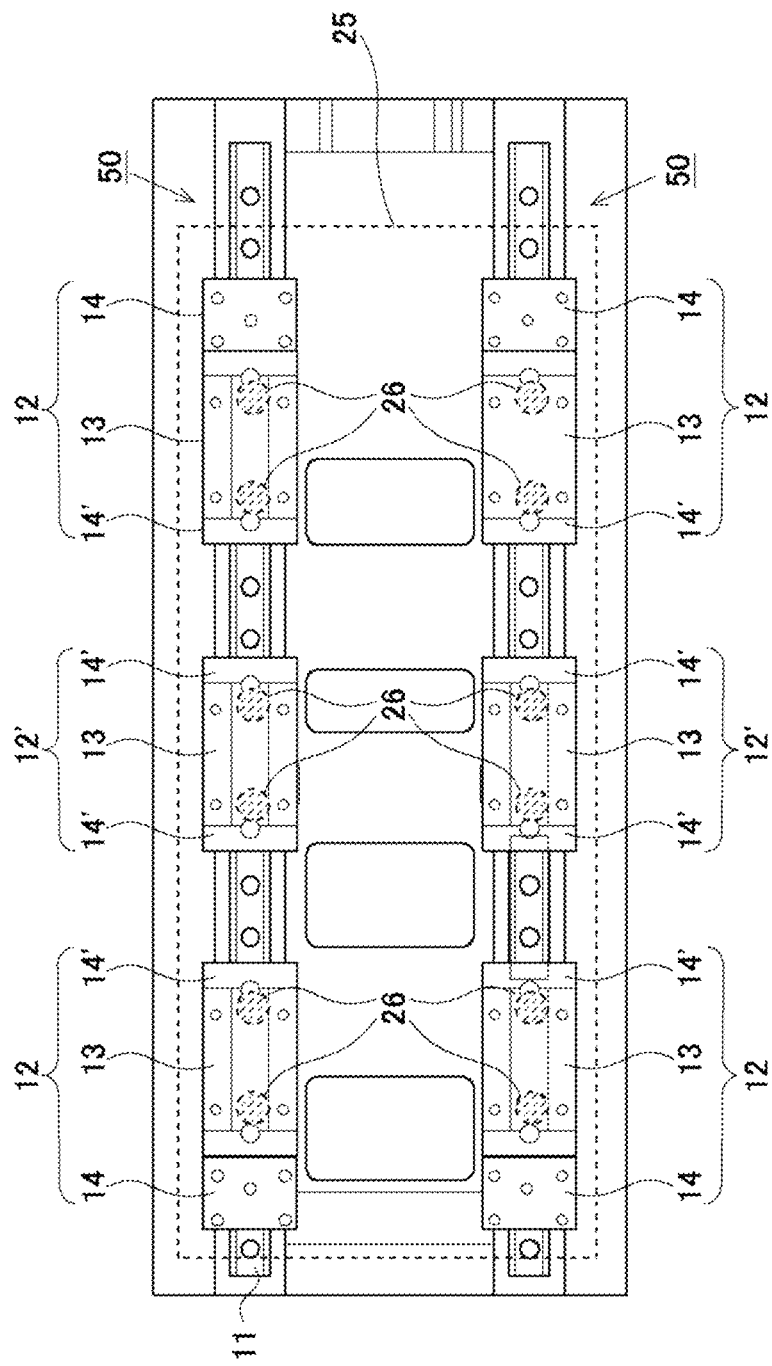
[Fig. 13]

GUIDE APPARATUS AND GUIDE STRUCTURE

TECHNICAL FIELD

The present invention relates to a technology of guiding a movable member relative to a track member in such a way as to allow relative movement.

BACKGROUND ART

Guide mechanisms of a table of a machine tool generally include a movable member adapted to be guided relative to a track member, such as a rail, in such a way as to be movable relative to the track member. The movable member is connected to a table so that a work set on the table can be moved during machining operation of the machine tool. When a force exerted by a cutting tool or the like acts on the work during machining, vibration will occur, possibly leading to a decrease in the machining precision. As a countermeasure to this, Patent Literature 1 in the citation list below discloses a structure having a slider functioning as a movable member provided with a damper plate whose contact with the track member can be controlled by hydraulic oil supplied to a closed space. While the slider is moving in this structure, the hydraulic pressure is controlled in such a way that the damper plate is in contact with the track member with a relatively small frictional force, and when the movement of the slider is to be stopped, the hydraulic pressure is controlled in such a way that an appropriate braking force is generated. When an external force acts on the slider in a rolling and/or pitching direction also, vibration generated due to the external force is damped by viscosity resistance of the hydraulic oil.

Patent Literature 2 discloses a technique of damping vibration by filling a gap between a buffer member and a track member with lubricant oil. The buffer member is constructed as a slider that is disposed at a position between guide carriages (movable members) set on the track member and movable relative to the track member in the same way as the guide carriages.

CITATION LIST

Patent Literature

Patent Literature 1: Japanese Utility Model Laid-Open No. H06-20899
Patent Literature 2: Japanese Patent Laid-Open No. H06-102288
Patent Literature 3: Japanese Patent Laid-open No. H03-31933

SUMMARY OF INVENTION

Technical Problem

There is a known technique that utilizes the squeeze film damper effect to damp vibration between a track member and a movable member. The squeeze film damper effect is achieved by providing a liquid in a gap between two closely located flat surfaces. Specifically, if the flat surfaces come closer due to an external force, the liquid between the flat surfaces moves out of the gap, so that a speed difference is generated due to viscosity resistance of the liquid. This speed difference acts as resistance against the external force to decrease vibration.

As above, to reduce vibration by the squeeze film damper effect, it is necessary to provide a liquid between flat surfaces. In the prior art structure, however, while the gap between the track member and the buffer member is filled with lubricant oil, the lubricant oil hardly remains in the gap stably because the buffer member slides relative to the track member with the guide carriages. Hence, the lubricant oil becomes insufficient in some cases, leading to difficulties in achieving adequate damping of vibration.

When an external force acts on a table that is guided by a guide unit including a track member extending in a longitudinal direction and at least two movable members adapted to be movable relative to the track member or a work set on the table, vibration tends to be generated around the center of gravity of the table. Vibration generated in this way can adversely affect machining of the work and deteriorate the accuracy of other operations. Hence, such vibration should be eliminated appropriately.

The present invention has been made to address the above problem, and its object is to provide a technique of satisfactorily damping vibration between a track member and a movable member or a technique of satisfactorily damping vibration generated in a table that is guided by a guide unit including a track member and at least two movable members.

Solution to Problem

A guide apparatus according to a first aspect of the present disclosure employs an arrangement that reduces vibration by providing a plate member on a portion of a surface of a movable member in such a way that a damping medium is held by it and another portion of the plate member slides on a track member instead of providing a medium for damping vibration such as a damping oil directly between the movable member and the track member. This arrangement can maintain relative movement of the movable member and the track member while holding the damping medium stable, thereby achieving favorable vibration reduction.

Specifically, the guide apparatus according to the first aspect of the present disclosure includes a track member extending along a longitudinal direction, a movable member having a first rolling surface that forms a load rolling passage together with a rolling surface of the track member and movable relative to the track member along the longitudinal direction of the track member by means of a plurality of rolling elements disposed in the load rolling passage, and a damper provided on a first area, the first area being at least a portion of the surface of the movable member opposed to the track member excluding the first rolling surface. The damper includes a plate member disposed in such a way as to cover the first area and a reservoir space formed between a first surface of the plate member and the first area. The reservoir space contains a damping medium and allows the plate member to displace relative to the first area. The damper is provided on the movable member in such a way that a second surface of the plate member slides on at least a portion of the surface of the track member opposed to the movable member.

A guide apparatus according to a second aspect of the present disclosure, a damper using a damping medium is provided on a movable member that is located outermost among movable members connected with a table. Thus, the damper is disposed at a location relatively far from the table in this arrangement, and therefore vibration generated in the table can be reduced effectively.

Specifically, the guide apparatus according to the second aspect of the present disclosure has a guide unit including a track member extending along a longitudinal direction and at least two movable members adapted to be movable relative to the track member to guide a table connected with the at least two movable members along the longitudinal direction. Each of the at least two movable members is provided with a first rolling surface that forms a load rolling passage together with a rolling surface of the track member and adapted to be movable relative to the track member along the longitudinal direction of the track member by means of a plurality of rolling elements disposed in the load rolling passage. Each of the two outer movable members that are located outermost among the at least two movable members is provided with a damper that is formed by providing a damping medium in a specific space between a surface of the outer movable member and a surface of the track member opposed to each other.

Advantageous Effects of Invention

According to the first aspect of the present disclosure, it is possible to damp vibration between the track member and the movable member favorably. According to the second aspect of the present disclosure, it is possible to damp vibration generated in the table guided by the guide unit favorably.

BRIEF DESCRIPTION OF DRAWINGS

FIG. 1 is a diagram illustrating the outer appearance of a guide apparatus according to the present disclosure.

FIG. 2 is a diagram illustrating movement of rolling elements in the guide apparatus.

FIG. 3 is a cross sectional view of the guide apparatus in a plane perpendicular to the direction in which a rail extends.

FIG. 4 is a first diagram illustrating the structure of a damper provided in the guide apparatus.

FIG. 5 is a second diagram illustrating the structure of a damper provided in the guide apparatus.

FIG. 6 is a diagram illustrating a carriage (or movable member) in the guide apparatus, which is cut away to show the interior of the carriage opposed to the rail.

FIG. 7 is a diagram illustrating the main body of the carriage.

FIG. 8 is a diagram illustrating the structure of a damper plate provided on the carriage main body.

FIG. 9 is a diagram illustrating an end plate of the carriage.

FIG. 10 is a diagram illustrating the structure a damper plate provided on the end plate of the carriage.

FIG. 11 is a cross sectional view of the guide apparatus in a plane extending along the direction in which the rail extends.

FIG. 12 is a top view of a guide apparatus including a pair of rails on each of which two carriages are disposed.

FIG. 13 is a top view of a guide apparatus including a pair of rails on each of which three carriages are disposed.

MODE FOR CARRYING OUT THE INVENTION

A guide apparatus according to the first aspect of the present disclosure includes a track member and a movable member. The track member and the movable member are adapted to allow their relative movement along the longitudinal direction of the track member. Between the track member and the movable member is formed a load rolling passage in which a plurality of rolling elements are provided, whereby the load of one of them is supported by the other and relative movement of the track member and the movable member is achieved. The load rolling passage is formed by a rolling surface of the track member by which the rolling elements are in contact with the track member and a rolling surface (first rolling surface) of the movable member by which the rolling elements are in contact with the movable member. The first rolling surface is a surface area of the movable member that is necessary to support the load for the aforementioned relative movement.

The guide apparatus includes a damper provided on a first area, which is at least a portion of the surface of the movable member opposed to the track member excluding the first rolling surface. The first area is the surface area of the movable member that is not required to support the load for the aforementioned relative movement. The damper is disposed using this first area. The first area in which the damper is disposed may be provided in any portion of the surface of the movable member that has no bearing on supporting load. Specifically, the damper includes a plate member provided in such a way as to cover the first area and damping medium contained in a reservoir space defined by the plate member and the first area. Examples of the damping medium include a liquid oil and a grease. The plate member is adapted to be capable of displacing relative to the first area. In other words, the distance between the plate member and the first area is variable with the damping medium contained between them. This distance is relatively very small, which may be e.g. 20 to 30 micrometers.

The damper is provided on the movable member in such a way that the other (or second) surface of the plate member facing away from the reservoir space slides on at least a portion of the surface of the track member. Thus, in connection with relative movement of the movable member and the track member in the guide apparatus according to the present disclosure, damping medium is not provided on the interface where sliding between the members occurs, but damping medium is provided or contained between the plate member and the movable member. Therefore, an external force attributed to the relative movement is unlikely to directly act on the damping medium.

If an external force acts on the guide apparatus configured as above to generate vibration that causes the distance between the plate member and the first area to decrease, the squeeze film damper effect is caused by the motion of the damping medium in the reservoir space to generate resistance to the vibration. The vibration is damped by this resistance. The damping medium is contained in the reservoir space, and the damping medium is basically kept in the reservoir space even while the plate member of the damper is displaced relative to the first area. Therefore, uncontrolled leakage of the damping medium hardly occurs. In consequence, relative movement of the movable member and the track member tends not to lead to diminishment of the squeeze film damper effect due to insufficiency of the damping medium, and it is possible to maintain the vibration damping effect stably.

The guide apparatus according to the second aspect of the present disclosure is an apparatus that guides a table by a guide unit including at least two movable members provided on one track member. The guide unit may include three or more movable members on one track member. The at least two movable members are connected with the table, and consequently the table is supported in such a way as to be movable relative to the track member. More specifically, a load rolling passage is formed between the track member and each movable member, and a plurality of rolling elements are provided in the load rolling passage. Thus, relative movement of the track member and each movable member is achieved with the load of one of them being supported by the other. The load rolling passage is formed by a rolling surface of the track member by which the rolling elements are in contact with the track member and a rolling surface (or the first rolling surface) of the movable member by which the rolling elements are in contact with the movable member. The first rolling surface is a surface area of the movable member that is necessary to support the load for the aforementioned relative movement.

The two outer movable members that are located outermost among the at least two movable members in the guide apparatus are provided with dampers that are integral with the respective outer movable members. The damper is formed by providing a damping medium in a specific space between a surface of the outer movable member and a surface of the track member opposed to each other. Examples of the damping medium include a liquid oil or a grease. The damping medium in the damper generates resistance to vibration generated in the guide apparatus to damp the vibration. For example, resistance to vibration is generated by the squeeze film damper effect with motion of the damping medium in the specific space, whereby the vibration is damped.

The outer movable members on which the damper is provided are the movable members that are located outermost among the at least two movable members. This means that in relation to the table connected with the at least two movable members, the damper is disposed at a location that is as far from the center of gravity of the table as possible. In the case where the table has a relatively high rigidity, when an external force acts on the table or a work set on the table, vibration in a rotational direction about the center of gravity of the table tends to occur. As the damper is disposed at a location that is as far from the center of gravity of the table as possible, the effect of the damping medium provided in the specific space of the damper on such vibration tends to be enhanced. In consequence, the vibration is damped by the damping medium effectively. In particular, the higher the speed of vibration acting on the damping medium is, the higher the resistance pressure against the vibration generated by the aforementioned squeeze film damper effect is. Therefore, disposing the damper far from the center of gravity of the table contributes to enhancement of the squeeze film damper effect.

In the following, a specific embodiment of the present invention will be described with reference to the drawings. The dimensions, materials, shapes, relative arrangements and other features that will be described in the description of the embodiment are not intended to limit the technical scope of the present invention only to them unless stated otherwise.

Structure of Guide Apparatus

FIG. 1 illustrates the outer appearance of a guide apparatus 1. The guide apparatus 1 includes a rail 11 (corresponding to the track member according to the present invention) and a carriage 12 (corresponding to the movable member according to the present invention) assembled to the rail 11 in such a way as to be movable relative to the rail 11 along its longitudinal direction. The rail 11 is attached to a base of a user's equipment, such as a machine tool, and a table 25 of the user's equipment is attached to the carriage 12 (see FIG. 12). The movement of the movable part including the table 25 is guided by the guide apparatus 1. Alternatively, the guide apparatus 1 may be arranged upside down, and the carriage 12 may be attached to the base of the user's equipment and the rail 11 to the table 25. The guide apparatus 1 may be used in a state in which the longitudinal direction of the rail 11 is not horizontal but slanted or perpendicular to the horizontal plane.

In this description, it is assumed that the rail 11 is arranged in a horizontal plane. In the description of the guide apparatus 1 the direction seen along the longitudinal direction of the rail 11, namely the direction of the x axis indicated in FIG. 1 will be referred to as the front-rear direction, the direction of the y axis will be referred to as the up-down (or vertical) direction, and the direction of the z axis will be referred to as the left-right direction. Needless to say, the arrangement of the guide apparatus 1 is not limited to this. FIG. 2 illustrates movement of rolling elements in the guide apparatus 1. FIG. 3 shows a cross section of the guide apparatus 1 in a plane perpendicular to the direction along which the rail 11 extends (i.e. Y-Z plane).

The rail 11 has rail side surfaces 11b on its left and right sides, each of which is provided with two (upper and lower) rolling surfaces 16b. The rail 11 has a rail top surface 11a at its top, which is provided with a through hole(s) 11c arranged at an appropriate pitch along the longitudinal direction through which fastening members for fastening the rail 11 on the base of the user's equipment are to be passed.

The carriage 12 includes a central portion opposed to the rail top surface 11a of the rail 11 and a pair of side portions opposed to the side surfaces of the rail 11 to form a U-shape in cross section. More specifically, the carriage 12 includes a carriage main body 13 (corresponding to the "movable member main body" according to the present disclosure) at the center with respect to the direction of movement and a pair of end plates 14 (corresponding to the "end members" according to the present disclosure) provided on both ends of the carriage main body 13 with respect to the direction of movement. The carriage main body 13 includes a central portion 13a opposed to the rail top surface 11a of the rail 11 and a pair of side portions 13b opposed to the rail side surfaces 11b of the rail 11 to form a U-shape in cross section. Likewise, the end plate 14 includes a central portion 14a (corresponding to the "end member central portion" according to the present disclosure) opposed to the rail top surface 11a of the rail 11 and a pair of side portions 14b (corresponding to the "end member side portion" according to the present disclosure) opposed to the rail side surfaces 11b of the rail 11 to form a U-shape in cross section (see FIG. 9). Each end plate 14 is fastened to the carriage main body 13 by fastening members, such as screws.

As illustrated in FIGS. 2 and 3, the carriage main body 13 is provided with four rolling surfaces 16a (corresponding to the "first rolling surface" according to the present disclosure) opposed to the four rolling surfaces 16b of the rail 11. The rolling surfaces 16a and the rolling surfaces 16b together define load rolling passages 16. The carriage main body 13 is also provided with return passages 17 formed inside the carriage main body 13 parallel to the load rolling passages 16. Each end plate 14 is provided with U-shaped turning passages 18 that connect the load rolling passages 16 and the return passages 17. The inner circumferential portion of the turning passage 18 is defined by an inner circumferential part 19 having a semi-circular cross section and integral with the carriage main body 13. The load rolling passage 16 between the rolling surface 16b of the rail 11 and the rolling surface 16a of the carriage main body 13, the two turning passages 18, and the return passage 17 constitute an oval circulation passage. A plurality of rollers 15 (corresponding to the "rolling elements" according to the present disclosure) are provided in this circulation passage. As the carriage 12 moves relative to the rail 11, the rollers 15 provided between them roll in the load rolling passage 16. The rollers 15 present in the load rolling passage 16 support or bear the load between the carriage 12 and the rail 11. In consequence, the rolling surfaces 16*a*, 16*b* receive the load. When a roller 15 rolls to come to one end of the load rolling passage 16, it enters one turning passage 18, and then passes through the return passage 17 and the other turning passage 18 to return to the other end of the load rolling passage 16. The aforementioned load does not act basically on the rollers 15 present in the return passage 17 or the turning passages 18.

Structure of Damper 30

The carriage 12 in the guide apparatus 1 is provided with a damper 30. The damper 30 is a mechanism adapted to damp vibration generated due to external forces acting on the guide apparatus 1 by the squeeze film damper effect. While in the case illustrated in FIG. 3 the damper 30 is provided on the surface of the central portion 13*a* of the carriage main body 13 opposed to the rail top surface 11*a* of the rail 11, positioning of the damper 30 is not limited to this. Positioning of the damper 30 on the carriage 12 will be described later. Here, the structure of the damper 30 will firstly be described in terms of its principle with reference to FIG. 4. The shapes and the dimensions of the specific parts (e.g. damper plates 301 to 303 shown in FIGS. 7 to 10) that constitute the damper 30 actually attached to the carriage 12 are different from those in the embodiment illustrated in FIG. 4. The damper 30 is provided between the rail 11 and the carriage 12 opposed to each other and attached to the carriage main body 13 and the end plates 14 that constitute the carriage 12. FIG. 4 illustrates positional relationship of the carriage 12 and the rail 11 relative to the damper 30 without limiting a specific position on the carriage 12 at which the damper 30 is attached, for the sake of simplicity of illustration.

The damper 30 includes a damper plate 31 (corresponding to the "plate member" according to the present disclosure) and a seal member 32 (corresponding to the "seal member" according to the present disclosure) and has a reservoir space 33 formed between the carriage main body 13 by the damper plate 31 and the seal member 32. The damper plate 31 is a plate member made of a resin. One surface 31*a* of the damper plate 31 faces the carriage 12, and the other surface 31*b* faces the rail 11. The damper plate 31 is positioned relative to the carriage 12 by a positioning pin(s) 35 in such a way that its one surface 31*a* covers a specific area 20 (corresponding to the "first area" according to the present disclosure) of the surface of the carriage 12 opposed to the rail 11 excluding the rolling surfaces 16*a* that form the load rolling passages 16. Thus, the damper plate 31 is disposed using an area of the surface of the carriage 12 that has no bearing on supporting load.

The positioning pin(s) 35 is fixedly planted on the carriage 12. The surface 31*a* of the damper plate 31 is provided with a positioning hole(s) 35*a*, into which the positioning pin(s) 35 is inserted. The depth of the positioning hole(s) 35*a* on the damper plate 31 is designed in such a way as to allow displacement of the damper plate 31 relative to the first area 20 in the state in which the damper 30 is attached to the carriage 12. In other words, the positioning pin(s) 35 and the positioning hole(s) 35*a* are designed in such a way as to allow movement of the damper plate 31 toward and away from the carriage surface including the first area 20 while restricting the movement of the damper plate 31 parallel to the carriage surface.

The seal member 32 is provided between the damper plate 31 and the first area 20 of the carriage 12. The seal member 32 is made of an elastically deformable resin material. The seal member 32 is fitted in a groove 38 provided on the surface 31*a* of the damper plate 31 (see a groove 381 shown in FIG. 8 and a groove 382 shown in FIG. 10 also) and sandwiched between the damper plate 31 and the carriage 12, as illustrated in FIG. 4. When simply fitted in the groove 38, the seal member 32 protrudes from the groove 38. In this state, the height of the seal member 32 from the surface 31*b* of the damper plate 31 is larger than the distance between the carriage 12 and the rail 11 shown in FIG. 4. Hence, when the carriage 12 is assembled to the rail 11 after positioning the damper plate 31 to the carriage 12 as shown in FIG. 4, the seal member 32 is pressed by uniform strength to deform.

Consequently, the surface 31*b* of the damper plate 31 is kept pressed against the surface of the rail 11 by a certain strength by the elastic force of the seal member 32. Furthermore, since the seal member 32 is sandwiched between the damper plate 31 and the carriage 12 in a deformed state, the surface 31*a* of the damper plate 31 and the first area 20 of the carriage 12 are separated from each other by a specific distance. This specific distance is, for example, 20 to 30 µm. In consequence, a reservoir space 33 is defined by the surface 31*a* of the damper plate 31, the first area 20 of the carriage 12, and the seal member 32. The reservoir space 33 is filled with damping oil 21. The damping oil 21 corresponds to the damping medium according to the present disclosure. Alternatively, a grease may be used as the damping medium. The damping oil 21 is supplied into the reservoir space 33 through an oil supply channel 13*c* (see FIG. 3) communicating with the reservoir space 33 provided in the carriage 12 and, after the damper 30 is attached to the carriage 12 and the carriage 12 is assembled to the rail 11. The seal member 32 is not necessarily required to be provided between the damper plate 31 and the first area 20 of the carriage 12. The seal member 32 may be eliminated if it is possible to keep the damping oil 21 in the reservoir space 33 between the surface 31*a* of the damper plate 31 and the first area 20 of the carriage 12 and to keep the specific distance between the surface 31*a* of the damper plate 31 and the first area 20 of the carriage 12 without it.

With the damper 30 configured as above, if an external force acts on the carriage 12 to generate vibration, the gap or distance between the surface 31*a* of the damper plate 31 and the first area 20 of the carriage 12 varies with slight deformation of the seal member 32. In consequence, the squeeze film damper effect according to the following equation 1 can be achieved:

$$p = \frac{3\mu}{h^3}(r^2 - r_a^2)V, \qquad \text{equation 1}$$

where P is the pressure distribution, h is the gap of the reservoir space 33 (i.e. the distance between the surface 31*a* and the first area 20), p is the coefficient of viscosity of the damping oil 21, r is the radial coordinate (where the origin is set at the center of the first area 20) of a the squeeze surface (i.e. a surface including the first area 20), $r_a$ is the largest radius of the squeeze surface, and V is the approach velocity of the squeeze surface toward the surface 31*a*.

When an external force acts on the carriage 12 to generate vibration, the vibration affects the approach velocity V in equation 1. Consequently, the pressure distribution p according to the squeeze film damper effect results as resistance to the approach velocity V to achieve damping effect on the vibration.

In the case of the damper 30 illustrated in FIG. 4, the gap h of the reservoir space 33 is set as small as 20 to 30 μm by way of example. According to equation 1, the smaller the gap h is, the greater the resistance by the squeeze film damper effect is. However, it is preferred that the gap h be designed such that the carriage 12 will not interfere with the damper plate 31 when vibration occurs in the carriage 12. To achieve effective resistance by the squeeze film damper effect, it is preferred that the value of $r_a$ in equation 1 be as large as possible. In this connection, it is preferred that the first area set 20 in the carriage 12 be designed as large as possible.

In the case of the damper 30 illustrated in FIG. 4, the reservoir space 33 is formed between the surface 31a of the damper plate 31 and the first area 20 on the surface of the carriage 12. When the carriage 12 and the rail 11 move relative to each other, sliding occurs between the surface 31b of the damper plate 31 and the rail 11. Therefore, the damping oil 21 contained in the reservoir space 33 is not directly affected by relative movement of the carriage 12 and the rail 11. In consequence, the damping oil 21 is reliably kept in the reservoir space 33 and able to achieve vibration damping effect by the squeeze film damper effect favorably.

Since sliding occurs between the surface 31b of the damper plate 31 and the surface of the rail 11 with relative movement of the carriage 12 and the rail 11, it is preferred that a film 22 of lubricant oil be provided between these surfaces. The lubricant oil corresponds to the lubricant according to the present disclosure. This film 22 can reduce frictional resistance in sliding and make damping of vibration by the squeeze film damper effect more effective. The inventors of the invention disclosed herein discovered that the presence of the lubricant oil film 22 causes resistance by the squeeze film damper effect more effectively under vibration of the carriage 12. The lubricant oil used may be a conventional oil. The lubricant oil may be either the same as or different from the damping oil. It is preferred that the film 22 of the lubricant oil be formed in such a way that the gap h of the reservoir space 33 is larger than the thickness of the film 22. This can keep a good balance between reduction of frictional resistance by the film 22 and generation of resistance by the squeeze film damper effect.

Modification of Damper 30

A modification of the damper 30 will be described here with reference to FIG. 5. FIG. 5 is a cross sectional view similar to FIG. 4 schematically illustrating the structure of a modified damper 30. The damper 30 illustrated in FIG. 5 differs from the damper illustrated in FIG. 4 in that the damper plate 31 is provided with a through hole(s) 37 passing through it from the surface 31a to the surface 31b. In other words, the through hole(s) 37 opens to the reservoir space 33 and to the sliding surface between the surface 31b of the damper plate 31 and the surface of the rail 11. The diameter of the through hole(s) 37 is designed such that the damping oil contained in the reservoir space 33 is supplied to the aforementioned sliding surface to form the film 22 of an appropriate thickness. This does not mean immoderate discharge of the damping oil contained in the reservoir space 33. The diameter of the through hole(s) 37 is so small that the damping oil cannot be discharged actually unless the pressure in the reservoir space 33 is higher than the pressure on the sliding surface side. Hence, the damping oil in the reservoir space 33 is kept appropriately.

In actual implementation, the damping oil in the reservoir space 33 is supplied to the sliding surface between the surface 31b of the damper plate 31 and the surface of the rail 11 by increasing the supply pressure of damping oil through the oil supply channel 13c communicating with the reservoir space 33. In consequence, the structure illustrated in FIG. 5 can achieve stable preservation of damping oil in the reservoir space 33 and an appropriate quantity of supply of damping oil to the sliding surface both. Thus, it is possible to reduce frictional resistance in sliding and to damp vibration by the squeeze film damper effect more effectively.

Position of Damper 30

Next, concrete positioning of the damper 30 on the carriage 12 will be described with reference to FIGS. 6 to 10. In FIG. 6, the carriage 12 is cut along its longitudinal direction to make the interior of the carriage 12 opposed to the rail 11 visible. As described above, the carriage 12 includes the carriage main body 13 and the two end plates 14. The carriage main body 13 includes the central portion 13a and the two side portions 13b. Each end plate 14 includes the central portion 14a and the two side portions 14b. In the case of the structure illustrated in FIG. 6, the damper 30 is provided on the central portion 13a of the carriage main body 13 and the central portion 14a and the side portions 14b of the end plates 14. The position of the damper 30 will be specifically described in the following.

In the case of the carriage main body 13, as illustrated in FIG. 6, the damper 30 is provided on the surface of the central portion 13a that faces the rail top surface 11a of the rail 11. This surface will be hereinafter referred to as the "inner ceiling surface". FIG. 7 illustrates the carriage main body 13 with the damper 30 provided on the aforementioned inner ceiling surface, and FIG. 8 illustrates the structure of a damper plate 301 (corresponding in function to the damper plate 31 shown in FIGS. 4 and 5) constituting this damper 30. The upper drawing (a) in FIG. 8 illustrates the damper plate 301 in a state showing its surface 301a (corresponding in function to the surface 31a shown in FIGS. 4 and 5) that is opposed to the surface of the carriage main body 13 (i.e. the surface corresponding in function to the first area 20 shown in FIGS. 4 and 5). The lower drawing (b) in FIG. 8 illustrates the damper plate 301 in a state showing its surface 301b (corresponding in function to the surface 31b shown in FIGS. 4 and 5) that is opposed to the rail top surface 11a of the rail 11.

The surface 301a of the damper plate 301 is provided with a groove 381 in which a seal member corresponding in function to the seal member 32 shown in FIGS. 4 and 5 is to be fitted. A space (corresponding in function to the reservoir space 33 shown in FIGS. 4 and 5) in which damping oil 21 is to be contained will be formed between the surface 301a inside the groove 381 and the upper ceiling surface (corresponding in function to the first area 20 shown in FIGS. 4 and 5) of the carriage main body 13 opposed to the surface 301a. The surface 301a outside the groove 381 is provided with a positioning hole(s) 35a used to position the damper plate 301 on the central portion 13a of the carriage main body 13.

The surface 301b of the damper plate 301 is a surface sliding on the rail top surface 11a. This surface 301b is provided with a plurality of depressions 391. The depression is a dimple having a depth of several tens micrometers and shaped such that lubricant oil of the film 22 is prone to be collected in it. The damper plate 301 is also provided with a through hole(s) 371 corresponding in function to the through hole(s) 37 shown in FIGS. 4 and 5. The through hole(s) 371 open on the surface 301a surrounded by the groove 381 and also on the surface 301b. This allows the damping oil in the aforementioned reservoir space to be supplied as lubricant oil as illustrated in FIG. 5. In consequence, an appropriate quantity of lubricant oil (i.e. damping oil supplied through the through hole(s) 371) is maintained on the sliding surface. Thus, it is possible to reduce frictional resistance in sliding and to damp vibration by the squeeze film damper effect more effectively, as described above.

The side portions 13b of the carriage main body 13 are not provided with the damper 30. This is because, as will be seen from FIG. 3, the surface of each side portion 13b that is opposed to the rail side surface 11b is provided with the rolling surfaces that partly form the load rolling passages 16, and a surface area corresponding to the aforementioned first area 20 is not available on this surface. However, if a surface area corresponding to the first area 20 is available on the side portions 13b of the carriage main body 13, the damper 30 based on the technical idea disclosed in FIGS. 4 and 5 may be provided on them.

In the case of the end plate 14, as illustrated in FIG. 6, the damper 30 is provided on the surface of the central portion 14a that is opposed to the rail top surface 11a of the rail 11 (which will be hereinafter referred to as the "inner ceiling surface") and the surfaces opposed to the rail side surfaces 11b (which will be hereinafter referred to as the "inner side surfaces"). FIG. 9 illustrates the end plate 14 with the dampers 30 provided on the aforementioned inner ceiling surface and the inner side surfaces. FIG. 10 illustrates the structure of a damper plate 303 (corresponding in function to the damper plate 31 shown in FIGS. 4 and 5) that is used to constitute the damper 30 provided on the inner side surface. The upper drawing (a) in FIG. 10 illustrates the damper plate 303 in a state showing its surface 303a (corresponding in function to the surface 31a shown in FIGS. 4 and 5) that is opposed to the surface of the end plate 14 (corresponding in function to the first area 20 shown in FIGS. 4 and 5). The lower drawing (b) in FIG. 10 illustrates the damper plate 303 in a state showing its surface 303b (corresponding in function to the surface 31b shown in FIGS. 4 and 5) that is opposed to the rail side surface 11b of the rail 11.

The damper plate 302 (corresponding in function to the damper plate 31 shown in FIGS. 4 and 5) used to constitute the damper 30 provided on the inner ceiling surface of the end plate 14 has a rectangular shape similar to the damper plate 301 illustrated in FIG. 8 and is configured to have substantially the same function as the damper plate 301. Therefore, the specific structure of the damper plate 302 can be understood by considering the disclosure relating to the damper plate 301, and it will not be specifically described in the present disclosure.

Next, the damper plate 303 will be described. As illustrated in FIG. 9, when the end plate 14 is attached to the carriage main body 13, the side portions 14b of the end plate 14 are adjacent to the side portions 13b of the carriage main body 13. Each side portion 14b can be sectioned into a first section 141 that is close to the carriage main body 13 and a second section 142 that is far from the carriage main body 13. In the first section 141 is provided a member that forms the turning passage 18 shown in FIG. 2 (but not shown in FIG. 9). In contrast, in the second section 142 is provided no structure relating to the circulation passage for the rollers 15 as rolling elements. Hence, the second section 142 is used to provide the damper 30 in the side portion 14b. In other words, the second section 142 is added to the first section 141 in the end plate 14 so that a surface of the end plate that is opposed to the rail side surface 11b (i.e. a surface corresponding to the first area according to the present disclosure) can be provided. Thus, it is possible to provide a damper 30 in the side portion 14b.

The damper plate 303 has a bent shape shown in FIG. 10 following the shape of the rail side surface 11b on which the rolling surface 16b is formed. The surface 303b of the damper plate 303 is a surface sliding on the rail side surface 11b. The damper plate 303 has a surface 303b including a surface 303b1 opposed to the upper rolling surface 16b of the rail side surface 11b, a surface 303b2 opposed to the lower rolling surface 16b of the rail side surface 11b, and a surface 303b3 connecting the surface 303b1 and the surface 303b2 and opposed to the surface of the rail side surface 11b that connects the upper and the lower rolling surfaces 16b. This surface 303b is provided with a plurality of depressions 392. As with the depression 391, the depression 392 is a dimple having a depth of several tens micrometers and shaped such that lubricant oil of the film 22 is prone to be collected in it.

Another surface 303a of the damper plate 303 is opposed to the second section 142 of the side portion 14b of the end plate 14. The surface 303a includes surfaces 303a1, 303a2, and 303a3 corresponding to the surfaces 303b1, 303b2, and 303b3. The surface 303a of the damper plate 303 is provided with a groove 382 in which a seal member corresponding in function to the seal member 32 shown in FIGS. 4 and 5. Thus, a space in which damping oil 21 is to be contained (corresponding in function to the reservoir space 33 shown in FIGS. 4 and 5) is formed between the surface 303a inside the groove 382 and the inner side surface of the end plate 14 opposed to it (corresponding to the first area 20 shown in FIGS. 4 and 5). The surface 303a outside the groove 382 is provided with positioning holes 35a used to position the damper plate 303 on the side portion 14b of the end plate 14.

The damper plate 303 is also provided with a through hole(s) 372 corresponding in function to the through hole(s) 37 shown in FIGS. 4 and 5. The through hole(s) 372 opens on the surface 303a surrounded by the groove 382 and also to the surface 303b. This allows the damping oil in the aforementioned reservoir space to be supplied as lubricant oil as illustrated in FIG. 5. In consequence, an appropriate quantity of lubricant oil (i.e. damping oil supplied through the through hole(s) 372) is maintained on the sliding surface. Thus, it is possible to reduce frictional resistance in sliding and to damp vibration by the squeeze film damper effect more effectively, as described above.

As the damper plate 303 is designed in a bent shape as above, the largest area of the squeeze surface in equation 1 can be made larger. This contributes to maximization of the squeeze film damper effect and improves the efficiency of vibration damping.

As described above, in the carriage 12 illustrated in FIG. 6, the dampers 30 are provided on the central portion 13a of the carriage main body 13 and on the central portion 14a and the side portions 14b of the end plates 14. This arrangement of the dampers 30 provides as many dampers 30 as possible on the surfaces of the carriage 12 that are opposed to the rail top surface 11a and the rail side surfaces 11b of the rail 11. In consequence, this arrangement can effectively damp vibration in the radial direction (i.e. the direction along the y axis), vibration in the pitching direction (i.e. the rotational direction about the z axis), vibration in the yawing direction (i.e. the rotational direction about the y axis), and the rolling direction (i.e. the rotational direction about the x axis) that are caused when an external force acts on the carriage 12 moving relative to the rail 11.

Alternatively, the damper 30 may be provided on at least one of the central portion 13*a* of the carriage main body 13, the central portion 14*a* and the side portions 14*b* of the end plates 14. For example, the damper 30 may be provided at such a position that vibration is damped effectively according to the mode of vibration generated by an external force acting on the carriage 12.

While in the arrangement illustrated in FIGS. 6 and 9 dampers 30 are built in the end plate, dampers 30 may be built in a separate casing other than the end plate. Specifically, an end plate provided with only an arrangement for forming a circulation passage for rollers 15 may be used as an end plate 14' (see FIG. 12 mentioned later). This end plate 14' is not provided with a damper 30. Additionally, a damper 30 may be built in a casing capable of moving relative to the rail 11 and including a central portion and a pair of side portions similar to the end plate 14, and the casing may be attached to the outer side of the end plate 14'. The damper 30 may be built in at least one of the central portion and the side portions of the casing.

Modification of the Damper Plate 301

A modification of the damper plate 301 used to constitute the damper 30 of the carriage main body 13 will be described with reference to FIG. 11. FIG. 11 is a cross sectional view of the carriage 12 taken along the longitudinal direction, showing a portion near one end of the damper plate 301. As described above, when the carriage 12 is assembled to the rail 11 with the damper plate 301 attached to the carriage main body 13, it is necessary to perform assembling while deforming the seal member 32. For this reason, assembling is not easy in some cases. The surface 301*b* of the damper plate 301 according to this modification is shaped convex such that the thickness of the damper plate 301 decreases toward its end (the right end in FIG. 11) with respect to the longitudinal direction of the rail 11. In consequence, assembling of the carriage 12 to the rail 11 can be performed easily.

Vibration Damping Effect on Table 25 to which Guide Apparatus is Assembled

On the basis of the technical idea relating to vibration damping that has been described in the foregoing, a vibration damping effect on a table 25 to which the guide apparatus according to the present disclosure is assembled will be described with reference to FIG. 12. FIG. 12 schematically illustrates the structure of the guide apparatus according to the present disclosure assembled to the table 25. Specific dimensions and shapes of the components such as the rail 11 may be changed fitly. In FIG. 12, to facilitate understanding of the position of the carriages 12, the table 25 attached to the carriages 12 and locations of connection 26 of the table 25 and the carriages 12 are drawn by broken lines.

In the guide apparatus illustrated in FIG. 12, each of the two rails 11 is assembled with two carriages 12. In other words, this guide apparatus includes two guide units 50 each of which includes two carriages 12 assembled to one rail 11. The two rails 11 extend parallel. The carriage 12 shown in FIG. 12 includes the end plate 14 provided with the damper 30 illustrated in FIG. 9 and the above-described end plate 14' provided with a structure for forming a circulation passage for rollers 15 and no damper 30 that are attached to the carriage main body 13 provided with the damper 30 illustrated in FIG. 7. The end plate 14 is disposed on the outer side in each of the two carriages 12 disposed on each rail 11, and the end plate 14' is disposed on the inner side. In FIG. 12 (and also in FIG. 13 that will be referred to later), the side on which the adjacent carriage in each guide unit 50 is present is defined as the inner side, and the side on which the adjacent carriage is not present is defined as the outer side.

In each of the guide units 50 shown in FIG. 12, the dampers 30 are provided on the carriage main body 13 and/or the end plate 14 of the carriage 12 that is located outermost (corresponding to the "outer movable member" according to the present disclosure). In other words, the damper 30 is provided integrally with that carriage 12. If the locations of connection 26 of the table 25 and each carriage 12 is used as a fiducial point, the damper 30 on the end plate 14 is located on the outer side of the closest location of connection 26. With this arrangement, the dampers 30 in the four carriages 12 of the guide apparatus connected to the table 25 are located as far from the center of gravity of the table 25 as possible. This means that the dampers 30 are positioned at locations at which the approach velocity V in equation 1 is relatively high under vibration centered in the neighborhood of the center of gravity of the table 25 that occurs when an external force acts on the table 25 or an object placed thereon, such as a work. Therefore, the squeeze film damper effect with the dampers 30 is enhanced, thereby achieving favorable vibration damping.

In contrast, some conventional guide apparatuses include two rails 11 to each of which two carriages are assembled, and each carriage includes a carriage main body that is not provided with the damper 30 illustrated in FIG. 7 and two end plates attached thereto that are not provided with the damper 30. This means that the conventional apparatuses are not provided with a mechanism for damping vibration generated by an external force.

We prepared a guide apparatus according to the present disclosure and a conventional guide apparatus to each of which a table 25 is assembled and measured the ease to vibration of them under application of vibration in the radial direction (i.e. the direction of Y axis), in the pitching direction (i.e. the rotational direction about the z axis), in the yawing direction (or the rotational direction about the y axis), and in the rolling direction (i.e. the rotational direction about the x axis) with a weight being placed on the table 25. In the measurement of vibration in the radial direction, a certain magnitude of vibration excitation force was applied in the y axis direction to the center of the top surface of the weight at a certain excitation force, and the ease of vibration was measured in its vicinity. In the measurement of vibration in the pitching direction, a certain magnitude of vibration excitation force was applied in the y axis direction to the center of one end of the table 25 with respect to the x axis direction, and the ease to vibration was measured at the center of the same side end of the top surface of the weight with respect to the x axis direction. In the measurement of vibration in the yawing direction, a certain magnitude of vibration excitation force was applied in the z axis direction to the center of one end of the table 25 with respect to the x axis direction, and the ease to vibration was measured at the center of the same side end of the top surface of the weight with respect to the x axis direction. In the measurement of vibration in the rolling direction, a certain magnitude of vibration excitation force was applied in the y axis direction to the center of one end of the table 25 with respect to the z axis direction, and the ease to vibration was measured at the center of the same side end of the top surface of the weight with respect to the z axis direction.

The result of the above measurement showed that the guide apparatus illustrated in FIG. 12 achieved vibration damping of approximately 46% in the radial direction, approximately 45% in the pitching direction, approximately 83% in the yawing direction, and approximately 70% in the rolling direction as compared to the conventional guide apparatus. Vibration damping was particularly great in the yawing direction. This is considered to be attributed to the dampers 30 provided in the side portions 14b of the end plates 14. It will be understood from the above that the guide apparatus provided with the dampers 30 according to the present disclosure achieves excellent vibration damping.

Modification of Guide Apparatus

A modification of the guide apparatus according to the present disclosure will be described with reference to FIG. 13. The guide apparatus illustrated in FIG. 13 includes guide units 50 each of which includes three carriages. The two carriages among them that are located outermost are the same as the carriages 12 illustrated in FIG. 12. Provided between these two carriages 12 is a conventional carriage 12'. This carriage 12' is composed of a carriage main body 13' not provided with the damper 30 illustrated in FIG. 7 and two end plates 14' not provided with the damper 30 attached on both ends of the carriage main body 13'. As with the mode illustrated in FIG. 12, each guide unit 50 in this guide apparatus configured as above also includes dampers 30 provided integrally with the carriages 12 that are located outermost. If the location of connection 26 of the table 25 and each carriage 12 is used as a fiducial point, the damper 30 on the end plate 14 is located on the outer side of the closest location of connection 26. With this arrangement, the dampers 30 in the four outer carriages 12 among the six carriages 12 are located as far from the center of gravity of the table 25 as possible. Therefore, the squeeze film damper effect with the dampers 30 is enhanced, and favorable vibration damping can be achieved consequently.

Alternatively, the carriages 12 located outermost in each guide unit 50 may include end plates located at both ends that are configured as end plates 14 provided with dampers 30 as with the arrangement illustrated in FIG. 6. Still alternatively, the carriage located between the outermost carriages 12 in each guide unit 50 may be constructed as a carriage 12 provided with dampers 30 as illustrated in FIGS. 6 and 12.

Alternatively, the damper 30 having the structure illustrated in FIG. 4 or 5 may be replaced by a conventional arrangement that can achieve the squeeze film damper effect. For example, the guide unit 50 like that illustrated in FIG. 12 or 13 can be constructed using a carriage provided with a damper that is configured according to Patent Literature 2 (Japanese Patent Laid-Open No. H06-102288) mentioned above, namely a damper that achieves the squeeze film damper effect by damping oil provided in a gap (specific space) between the track member and the movable member, where sliding occurs. With this structure also, the dampers in the carriages located outermost in each guide unit 50 are located as far from the center of gravity of the table as possible, and therefore, the squeeze film damper effect with the dampers is enhanced, thereby achieving favorable vibration damping.

REFERENCE SIGNS LIST

1: guide apparatus
11: rail
11a: rail top surface
11b: rail side surface
12: carriage
13: carriage main body
13a: central portion
13b: side portion
13c: oil supply channel
14: end plate
14a: central portion
14b: side portion
15: roller
16: load rolling passage
16a: rolling surface
16b: rolling surface
20: first area
21: damping oil
22: lubricant oil
25: table
26: connector
30: damper
31: damper plate
31a: surface
31b: surface
32: seal member
33: reservoir space
35: positioning pin
35a: positioning hole
37: through hole
38: groove
50: guide unit
141: first section
142: second section
301: damper plate
302: damper plate
303: damper plate
371: through hole
381: groove
372: through hole
382: groove

The invention claimed is:

1. A guide apparatus comprising:
a track member extending along a longitudinal direction;
a movable member having a first rolling surface that forms a load rolling passage together with a rolling surface of the track member and movable relative to the track member along the longitudinal direction of the track member by means of a plurality of rolling elements disposed in the load rolling passage; and
a damper provided on a first area, the first area being an area on the surface at least a portion of the surface of the movable member opposed to the track member excluding the first rolling surface, wherein
the damper includes a plate member wherein the plate member disposed in such a way as to cover the first area on the surface of the movable member opposed to the track member, and
a reservoir space formed between a first surface opposed to the first area of the plate member and the first area, the reservoir space containing a damping medium and allowing the plate member to displace relative to the first area, and
the damper is provided on the movable member in such a way that a second surface of the plate member slides on at least a portion of the surface of the track member opposed to the movable member.

2. The guide apparatus according to claim 1, wherein a film of a lubricant is formed between the second surface of the plate member and the surface of the track member.

3. The guide apparatus according to claim 2, wherein the damper further includes a through hole passing through the plate member from the first surface to the second surface, the through hole allowing a portion of the damping medium contained in the reservoir space to be supplied as the lubricant.

4. The guide apparatus according to claim 2, wherein the second surface of the plate member is provided with a plurality of depressions capable of containing the lubricant.

5. The guide apparatus according to claim 2, wherein the distance between the first surface of the plate member and the surface of the movable member is set larger than the thickness of the film of the lubricant.

6. The guide apparatus according to claim 1, wherein the damper further includes a seal member, and the plate member is attached to the movable member with the seal member between, whereby the reservoir space is formed between the first surface of the plate member and the first area.

7. The guide apparatus according to claim 6, wherein the second surface of the plate member is shaped convex such that the thickness of the plate member decreases toward its end with respect to the longitudinal direction of the track member.

8. The guide apparatus according to claim 1, wherein
the track member is a rail member having a track top surface and a track side surface including the rolling surface of the track member,
the movable member includes a movable member main body including a central portion opposed to the track top surface and not provided with the first rolling surface and two side portions opposed to the track side surface and provided with the first rolling surface, and
the damper is provided on the first area set on the surface of the central portion opposed to the track top surface.

9. The guide apparatus according to claim 8, wherein
the movable member further includes an end member connected to the movable member main body, the end member including an end member central portion adjacent to the central portion, opposed to the track top surface, and not provided with the first rolling surface and two end member side portions respectively adjacent to the two side portions, opposed to the track side surface, and not provided with the first rolling surface, and
the damper is provided on the first area wherein the portion of the surface of the two end member side portions opposed to the track side surface.

10. The guide apparatus according to claim 9, wherein the damper is further provided on the first area wherein the portion of the surface of the end member central portion opposed to the track top surface.

11. A guide structure that allows a track member extending along a longitudinal direction and a movable member to move relative to each other along the track member and includes a damper provided on a first area wherein the portion of the surface of the movable member opposed to the track member, wherein
the damper includes a plate member wherein the plate member disposed in such a way as to cover the first area on the surface of the movable member opposed to the track member, and a reservoir space formed between a first surface opposed to the first area of the plate member and the first area, the reservoir space containing a damping medium and allowing the plate member to displace relative to the first area, and
the plate member is disposed in such a way that a second surface of the plate member slides on at least a portion of the surface of the track member opposed to the movable member.

12. A guide apparatus comprising a guide unit including a track member extending along a longitudinal direction and at least three movable members adapted to be movable relative to the track member and arranged side by side in the longitudinal direction of the track member, to guide a table connected with the at least three movable members along the longitudinal direction, wherein
each of the at least three movable members is provided with a first rolling surface that forms a load rolling passage together with a rolling surface of the track member and adapted to be movable relative to the track member along the longitudinal direction of the track member by means of a plurality of rolling elements disposed in the load rolling passage, and
each of the two outer movable members that are located outermost among the at least three movable members is provided with a damper that is formed by providing a damping medium in a specific space between a surface of the outer movable member and a surface of the track member opposed to each other.

13. The guide apparatus according to claim 12, wherein
the track member is a rail member having a track top surface and a track side surface including the rolling surface of the track member,
the outer movable member includes a movable member main body including a central portion opposed to the track top surface and not provided with the first rolling surface and two side portions opposed to the track side surface and provided with the first rolling surface, and
the damper is provided between the track top surface and the surface of the central portion opposed to the track top surface.

14. The guide apparatus according to claim 12, wherein
the track member is a rail member having a track top surface and a track side surface including the rolling surface of the track member,
the outer movable member includes a movable member main body including a central portion opposed to the track top surface and not provided with the first rolling surface, and two side portions opposed to the track side surface and provided with the first rolling surface,
the outer movable member includes an end member including an end member central portion adjacent to the central portion, opposed to the track top surface, and not provided with the first rolling surface and two end member side portions adjacent respectively to the two side portions, opposed to the track side surface, and not provided with the first rolling surface, and
the damper is provided between the track side surface and the surface of at least one of the two end member side portions opposed to the track side surface.

15. The guide apparatus according to claim 14, wherein the damper is provided between the track side surface and the surface of the end member side portion that is located outermost among the two end member side portions.

16. The guide apparatus according to claim 12, wherein in each of the two outer movable members, the damper is provided at a location on the outer side of a location of connection of the outer movable member and the table.

17. The guide apparatus according to claim 12, wherein
the damper is provided on a first area, the first area being at least a portion of the surface of the outer movable members opposed to the track member excluding the first rolling surface,
the damper includes a plate member disposed in such a way as to cover the first area and the specific space that constitutes a reservoir space containing the damping medium,
the reservoir space is a space formed between a first surface of the plate member and the first area by attaching the plate member to the outer movable member and adapted to allow the plate member to displace relative to the first area, and the damper is provided on the outer movable member in such a way that a second surface of the plate member slides on at least a portion of the surface of the track member opposed to the outer movable member.

18. The guide apparatus according to claim 17, wherein a film of a lubricant is formed between the second surface of the plate member and the surface of the track member.

19. The guide apparatus according to claim 18, wherein the damper further includes a through hole passing through the plate member from the first surface to the second surface, the through hole allowing a portion of the damping medium contained in the reservoir space to be supplied as the lubricant.

20. The guide apparatus according to claim 12, wherein the guide apparatus includes the two guide units, the track members in the two guide units extend in the same direction, and each of the two outer movable members in the two guide units is provided with the damper provided between the surface of the outer movable member and the surface of the corresponding track member.

\* \* \* \* \*